United States Patent
Hill

[11] 3,799,295
[45] Mar. 26, 1974

[54] VEHICLE DRUM BRAKES

[75] Inventor: Albert Charles Hill, Tyseley, England

[73] Assignee: Girling Limited, Birmingham, England

[22] Filed: Sept. 30, 1971

[21] Appl. No.: 185,336

[30] Foreign Application Priority Data
Oct. 2, 1970  Great Britain .................... 46946/70

[52] U.S. Cl. .......................... 188/79.5 GC, 188/331
[51] Int. Cl. ............................................. F16d 65/56
[58] Field of Search . 188/79.5 P, 79.5 GC, 196 BA, 188/217, 331

[56] References Cited
UNITED STATES PATENTS
3,213,970  10/1965  Dombeck et al. ............ 188/79.5 GC
3,295,638  1/1967  Bauman ........................... 188/331 X FOREIGN PATENTS OR APPLICATIONS
1,090,731  11/1967  Great Britain .............. 188/79.5 GC Primary Examiner—Duane A. Reger
Attorney, Agent, or Firm—Scrivener Parker Scrivener & Clarke

[57] ABSTRACT

A brake shoe reaction strut for supporting a brake shoe against braking reaction forces, is constructed as a telescopic strut provided with pre-stressed resilient means for resisting contraction thereof. The resilient means yields under a predetermined thrust loading to permit partial retraction movement of the brake shoes to allow, for example, for thermal contraction of the drum. The strut is advantageously combined with auto-adjuster means for compensating shoe lining wear by increasing the overall length of the strut.

7 Claims, 1 Drawing Figure

PATENTED MAR 26 1974    3,799,295
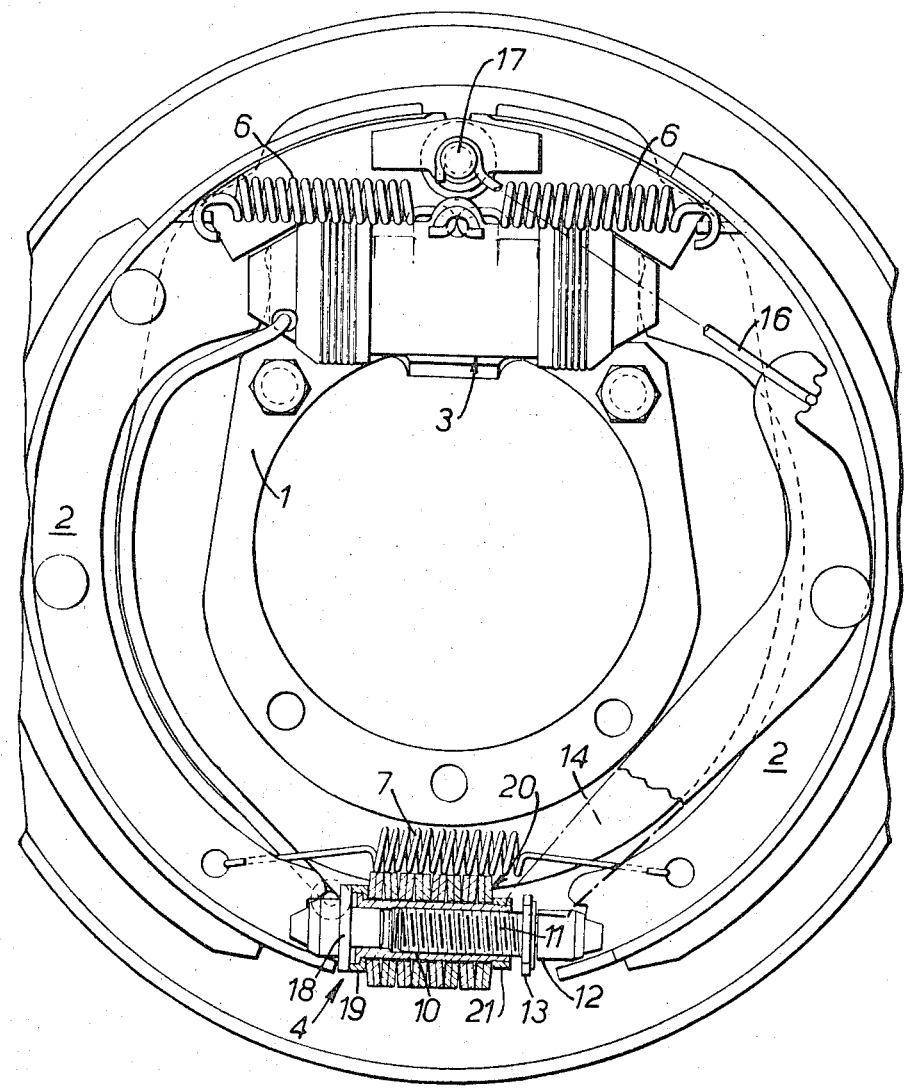

VEHICLE DRUM BRAKES

This invention relates to internal shoe drum brakes and to brake shoe reaction struts for use in such brakes, to support the brake shoes against the braking reaction forces transmitted to the shoes when the brakes are applied.

The invention has particular advantages in its application to drum brakes of the type including lock actuator means for holding the brake shoes applied to the drum for parking purposes.

For example, we have previously proposed a drum brake having a double-ended, dual chamber wheel cylinder incorporating an internal lock actuator for holding the brake shoes applied after release of braking pressure from the wheel cylinder. Such a wheel cylinder is suitable for use in a drum brake of the duo-servo type, in which the shoes are capable of some circumferential movement around the fixed back plate of the brake and are interconnected by a reaction strut which transmits forces from the leading shoe to the trailing shoe upon brake actuation in either direction of rotation of the brake drum.

One difficulty encountered with a brake of this form is the provision of a satisfactory arrangement which permits some retraction movement of the brake shoes to accommodate thermal contraction of the brake drum when the lock actuator has been applied with the drum in a hot condition.

The present invention aims at a solution to this problem and provides a brake shoe reaction strut for an internal shoe drum brake, comprising telescopic strut means and prestressed resilient means acting to resist contraction of the strut means but capable of yielding to permit some contraction of the strut means under the action of a predetermined thrust load.

The invention also includes an internal shoe drum brake incorporating such a reaction strut.

In a preferred form of the invention, the reaction strut is combined with an adjuster means for increasing the overall length of the strut to compensate for wear of the friction linings of the brake shoes.

One for of internal shoe drum brake in accordance with the invention is described below by way of example only, with reference to the accompanying drawings, which is a part sectional side elevation of the brake.

The brake illustrated in the drawing comprises a back plate 1, a pair of opposed, arcuate brake shoes 2, a double ended dual chamber slave cylinder 3 acting between one pair of adjacent shoe ends, a combined shoe reaction strut and automatic adjuster mechanism 4 arranged between the other pair of adjacent shoe ends, and shoe return springs 6 and 7.

The slave cylinder 3 incorporates a lock actuator and may be of the form illustrated in FIG. 5 of the Complete Specification of our co-pending patent application Ser. No. 17692/69 (U.S. Ser. No. 24,105 filed Mar. 31, 1970 now U.S. Pat. No. 3,684,063). However, it will be apparent to those skilled in the art that other forms of wheel cylinder and lock actuators could be employed. The body of the slave cylinder is mounted for axial movement on the back plate and is coupled to the two brake shoes by respective return springs 6.

The automatic adjuster comprises a tubular body or housing 10 internally screw threaded to receive a threaded spindle 11 carrying at its outer, right hand end a tappet 12 engaging the adjacent end of one brake shoe. The spindle also has a collar forming a ratchet wheel 13 engageable by the tip of a pawl lever 14 pivotally mounted on one brake shoe and restrained at its further end by a wire link 16 hooked over an anchor pin 17.

Inserted for axial movement in the left hand end of the housing 10 is a second tappet 18 engaging the adjacent brake shoe end. The tappet 18 abuts one end of a sleeve 19 which is slidably mounted on the adjacent end of the housing 10 and which forms an axially movable abutment for a stack of frusto-conical (Belleville) spring washers 20, pre-loaded in compression by a second, stationary but adjustable abutment in the form of a nut 21 threaded over the right-hand end of the housing 10. Outward movement (to the left) of the sleeve 19 relative to the housing 10 is limited by interengagement of mating flanges on these two parts. The abutting faces of the sleeve 19 and the tappet 18 are serrated to lock the two parts against relative rotation.

Operation of the adjuster takes place on braking during reverse rotation, for which the right hand brake shoe has maximum movement towards the drum. During this movement the pad lever 14 is caused to pivot in an anticlockwise direction its lower end striking downwardly, so that the tip slides along the side of the adjacent tooth, of the ratchet wheel 13. If adjustment is required, the lever tip picks up a fresh tooth, and upon brake release and consequential return movement of the lever, the ratchet wheel (and spindle 11) are rotated to effect an increment of adjustment. The housing 10 is locked against rotation during this adjustment by the friction clutching action exerted on it by the sleeve 19 under the action of the Belleville spring washers. If the load required to rotate the ratchet wheel should become excessive, the frictional restraint between the housing 10 and sleeve 9 will be overcome to permit rotation of the spindle 11 and housing 10 without adjustment being effected, thereby avoiding damage to the pawl 14.

If the lock is applied with the drum in a hot condition, subsequent retractive movement of the brake shoes is accommodated by deflection of the spring washers 20, permitting the tappet 18 to move axially into the housing 10. The spring washers 20 are pre-loaded sufficiently for them to transmit normal braking forces from one shoe to the other without substantial deflection but so as to deflect under the very high forces arising from thermal contraction of the drum. The arrangement enables the pre-load in the spring washers to be set at a high value, since the drum servo effect forces applied to them during normal braking are several times (approximately three times in a typical case) greater than the forces applied by the wheel cylinder. Deflection of the spring washers due to retractive shoe movements upon drum cooling, or due to exceptionally heavy braking forces being applied, is limited to the axial clearance existing between the tappet 18 and the adjacent end of the housing 10, these two parts constituting in this embodiment a telescopic strut means, contraction of which is resisted by the pre-stressed resilient means in the form of the stack of spring washers.

The reaction strut could, of course take many different forms from that described and illustrated above. In one alternative embodiment, such a strut may be incorporated in a brake of the type, usually known as a "Huck" brake, in which each brake shoe is supported against braking reaction by a strut pivotally connected between one end of the shoe and the back plate, respectively. In such a brake each pivoted strut would, in accordance with the present invention, be of telescopic construction and incorporate resilient means, preferably as described and illustrated herein, for resisting contraction of the strut.

I claim:

1. In or for an internal shoe drum brake, a brake shoe reaction strut comprising telescopic strut means and resilient means pre-stressed to resist contraction of the strut means but adapted to yield to permit some contraction of said strut means under the action of a predetermined thrust applied thereto, said strut means having opposite ends adapted for connection to respective adjacent ends of opposed brake shoes, for transmitting braking reaction forces between the shoes, and adjuster means for increasing the overall length of said strut to compensate for friction lining wear, said adjuster means comprising a pair of telescopically arranged screw threaded members, one of which is adapted at its outer end for connection to one brake shoe, and the other of which forms a part of the telescopic strut means and carries at its outer end a second part of the strut means adapted for connection to the other brake shoe, said parts being urged apart by said resilient means.

2. A strut as claimed in claim 1, wherein the resilient means comprises a stack of frustro-conical spring washers arranged alternatingly as to their conicity, so that some adjacent washers abut each other at their inner peripheries and others at their outer peripheries.

3. A strut as claimed in claim 2, wherein the first mentioned screw threaded member is a threaded spindle and the other is an internally threaded tubular housing the spindle projecting from one end of the housing and the second strut part extending from the other end of the housing.

4. A strut as claimed in claim 3, wherein the resilient means is mounted concentrically over the housing and acts between a fixed abutment at the said one end of the housing and an axially movable abutment at the other end of the housing, the said movable abutment engaging the second strut part and serving to transmit thrust forces from that part to the resilient means.

5. A strut as claimed in claim 4, including means locking said movable abutment against rotation relative to said second strut part, said resilient means urging said movable abutment into frictional engagement with a portion of said housing to restrain relative rotation of said housing relative to said second strut part.

6. A brake shoe reaction strut comprising telescopic strut means and resilient means pre-stressed to resist contraction of the strut means but adapted to yield to permit some contraction of said strut means under the action of a predetermined thrust applied thereto, in combination with an internal shoe drum brake having a brake shoe supported against braking reaction forces by said strut, brake applying means for applying said brake shoe and lock actuator means for holding said shoe applied for parking purposes, said resilient means being adapted to yield to permit partial shoe retraction to accommodate thermal contraction of the brake drum.

7. A brake shoe reaction strut comprising telescopic strut means and resilient means pre-stressed to resist contraction of the strut means but adapted to yield to permit some contraction of said strut means under the action of a predetermined thrust applied thereto, in combination with a drum brake comprising a pair of opposed brake shoes, brake applying means acting between said shoes at adjacent ends thereof and lock actuator means for holding said shoes applied after release of said applying means, said strut acting directly between said shoes at adjacent ends thereof to transmit braking reaction forces between said shoes.

* * * * *